United States Patent [19]

Johnson, Jr. et al.

[11] Patent Number: 4,905,303
[45] Date of Patent: Feb. 27, 1990

[54] TELEVISION AUDIO SIGNAL CONVERTER

[76] Inventors: John L. Johnson, Jr., 5512 Hillvale, Dallas, Tex. 75241; Robert J. Pitre, 2642 S. Harwood, Dallas, Tex. 75215

[21] Appl. No.: 215,354

[22] Filed: Jul. 5, 1988

[51] Int. Cl.⁴ .............................................. H04B 1/00
[52] U.S. Cl. ...................................... 455/45; 455/188; 455/205; 455/345; 358/189
[58] Field of Search ............... 455/345, 188, 205, 142, 455/206, 74, 132, 133, 47, 43, 74, 41, 20, 99; 358/189

[56] References Cited

U.S. PATENT DOCUMENTS

| | | | |
|---|---|---|---|
| 2,959,644 | 11/1960 | Grace | 455/99 |
| 3,054,058 | 8/1957 | Towler . | |
| 3,118,970 | 1/1964 | Silver | 455/41 |
| 3,259,689 | 6/1966 | Sienkiewicz | 455/20 |
| 4,272,783 | 6/1981 | Ogita . | |
| 4,396,941 | 8/1983 | Nishimura et al. . | |

OTHER PUBLICATIONS

Anon, *IV-Sound Front End Adapter*, Mar., 1976, pp. 334–340, INSPEC Patent Associated Literature.
Layfayette Radio Electronics catalog 700 1970, p. 183, *Lafayette Multiband TV, Police and Aircraft Radios.*
Consumers Digest, "FM" and Television, Roy L. Pepperburg, pp. 27–32, Sep. 1940.
Richard Graham, *TV Sound Tuners*, Jun. 1957, pp. 46–48.

*Primary Examiner*—Robert L. Griffin
*Assistant Examiner*—Curtis Kuntz
*Attorney, Agent, or Firm*—Crutsinger & Booth

[57] ABSTRACT

A converter to convert audio signal associated with commercial television transmissions for input into conventional AM/FM automobile receivers so as to facilitate listening to the audio portions of telecasts on conventional radios.

4 Claims, 2 Drawing Sheets

TELEVISION AUDIO SIGNAL CONVERTER

BACKGROUND OF THE INVENTION

This invention relates to circuits for receiving and converting the sound portion of conventional commercial television telecasts into signals suitable for introduction into the antenna terminals of conventional AM/FM radio receivers such as those typically installed in automobiles.

Television audio signal converters have heretofore been proposed, illustrative of which are those disclosed in U.S. Pat. No. 3,135,922 granted to Robert C. A. Eland on June 2, 1964 and U.S. 4,021,737 which was granted to Burdick S. Trask on May 3, 1977.

According to the former patent, a converter is provided which may be used in conjunction with a conventional television receiver whereby standard broadcast FM signals may be received on the conventional television channels of a television receiver.

According to the latter, in a conventional intercarrier type television receiver, advantage is taken of the fixed difference between the audio and video carrier frequencies of each channel by using an antenna tuned to a fixed frequency for sensing signals of that frequency radiated by the audio IF section of the TV set for each of the channels. The sensed signals are amplified prior to being demodulated and de-emphasized. The signals are then pre-emphasized in accordance with standard FM broadcast practice prior to being frequency modulated about a selected carrier frequency within the commercial FM band of 88-108 megahertz. The resulting FM signal is then transmitted by an antenna at a signal strength which is strong enough to allow for clear reception by an adjacent FM receiver within a high fidelity system and yet weak enough to comply with broadcasting regulations.

The apparatus of the former patent appears to provide for utilization of certain conventional TV circuitry to discretionarily provide not only the processing of the audio portion of TV signals, but also, optionally, a major portion of the processing of conventional FM signals, thereby eliminating the need for certain circuit components required if TV and FM circuits are made essentially independent.

The apparatus of the latter patent includes a radio-frequency receiver tuned to the frequency of the audio portion of the IF section of the TV set and thereby selects an audio information bearing signal which, with suitable processing is subsequently rebroadcast to be received by the conventional input circuits of a standard FM receiver.

Although the foregoing circuits provide for utilization of audio-bearing signals of one type with circuits of another type, there has nevertheless been a continuing need for simple and inexpensive circuits which provide for the reception of the audio-bearing portion of TV signals and their utilization within conventional FM receivers to provide FM audio sound output.

In contrast with the proposals of the foregoing patents, the circuits of the present invention are relatively simple and provide an easy-to-connect and inexpensive alternative for receiving the audio portion of conventional TV signals and processing that audio for introduction into the input stage of conventional FM stereo receivers.

BRIEF SUMMARY OF THE INVENTION

The present invention overcomes the disadvantages of the prior art by providing a relatively small, simple, inexpensive and easy to use device that can be readily attached to a conventional automobile or similar AM/FM receiver.

This is accomplished through the utilization of a UHF/VHF tuner, the output of which is processed through an oscillator-mixer and an output amplifier to provide an 88 megahertz FM signal adapted for the receiver input.

OBJECTS AND FEATURES

It is one general object of the invention to improve television frequency audio reception systems.

It is another object of the invention to simplify circuitry and reduce cost of interface circuits for interfacing UHF/VHF tuners with conventional FM receivers.

It is another object of the invention to provide a simple system for providing reception of TV audio signals through conventional FM receivers.

Accordingly, in accordance with one feature of the invention, a simple oscillator circuit is connected so as to be both a local oscillator and a mixer to provide an output signal having a suitable nominal frequency.

In accordance with yet another feature of the invention, the output of the mixer is conducted through a coupling transformer to the input of an output amplifier which produces an output of the required impedance to provide a suitable input for a conventional FM receiver.

These and other objects and features of the invention will become apparent from the following detailed description, by way of a preferred embodiment, with reference to the drawings in which like numerals designate like parts.

DETAILED DESCRIPTION OF INVENTION

Figure 1:
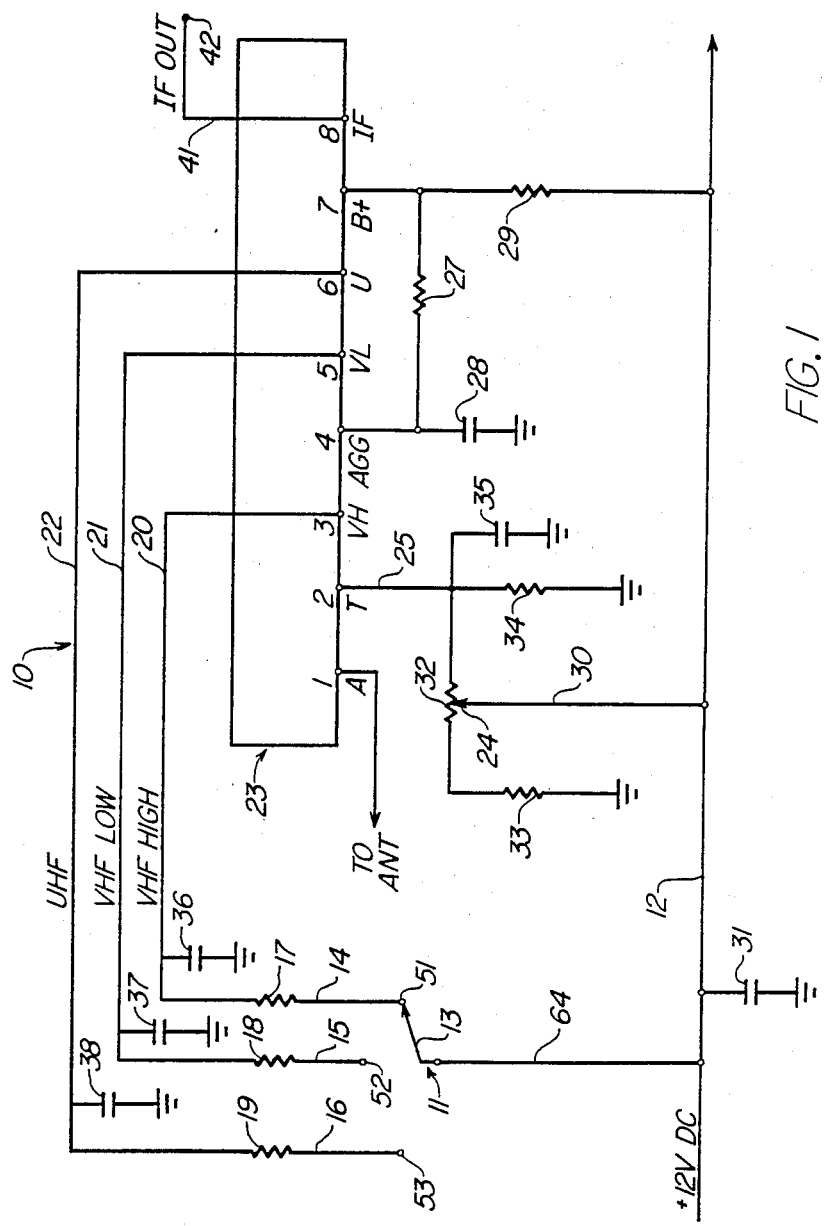
FIG. 1 is combination block and schematic diagram showing switching control input for and connection to a VHF/UHF tuner.

Now turning to the drawing and more particularly to FIG. 1 thereof, it will be observed that it portrays a control/power input circuit generally shown by the numeral 10. Approximately 12 volts DC is applied to the three position switch 11 via line 64 leading from conductor 12 which connects to any suitable source (not shown) of direct current power such as, for example, an automobile battery or an ac-dc converter. Switch 11 preferably is a switch of the three position slide type and includes main contact 13 which can be slidably engaged with any one of the three contacts S1, S2 and S3 which are respectively connected to conductors 14, 15 and 16. Contact S1 is connected to conductor 14, S2 to conductor 15, and S3 to conductor 16. Connected in series with conductors 14, 15 and 16 are resistors 17, 18 and 19 which, for example, may each be any suitable resistance as, for example, about 500 to 600 ohms. As will be subsequently observed, conductors 14, 15 and 16 connect through resistors 17, 18 and 19 and conductors 20, 21 and 22 with input terminals of a conventional VHF/UHF tuner 23, and by selectively actuating switch 11, selection is made between the following television bands: (1) VHF High, (2) VHF Low, and (3)

UHF. As is known by those skilled in the art, these designations relate respectively to the bands 174-216, 54-72 and 470-890 Megahertz.

For tuning of the particular TV channel signals within the particular television band selected by switch 11, a variable voltage which may be in the range of about +6 to +12 volts DC is applied to the tuning control terminal no. 2 of the tuner 23, herein designated "T". This variable voltage is derived from the 12 volts on line 12 through the voltage divider network comprising potentiometer 32 and resisters 33 and 34. As may be seen the +12v is applied via line 30 to the movable contact 24 of potentiometer 32. Resisters 33 and 34 are connected respectively between opposite ends of potentiometer 32 and ground. Thus, there is produced a variable voltage of from +6 to +12 volts (depending on the position of movable contact 24) at the junction between potentiometer 32 and resister 34. This voltage is applied to terminal no. 2 of tuner 23 through line 25.

As will be evident to one skilled in the art, any suitable UHF/VHF tuner may be employed in practicing the invention. However, according to the preferred embodiment, the commercially available tuner model UV30-A4 manufactured by Sharp Electronics Company of Japan has been used. Accordingly, the terminal designations set forth on the drawings relate to that particular tuner. If other suitable tuners are employed, it is contemplated that connections corresponding to those herein described are to be made.

Returning now to an examination of the connections to the tuner, it will be observed that terminal S1 leads via conductor 14, resistor 17 and conductor 20 to the tuner terminal no. 3 identified VH (standing for VHF High) on UHF/VHF under 23. In like manner, conductors 15 and 16 extend from switch positions S2 and S3 respectively to UHF/VHF tuner terminals nos. 5 and 6, VL and U (which stand respectively for VHF Low and UHF) via resistor-conductor pairs 18/21 and 19/22.

Also provided on tuner 23 is an antenna input terminal, no. 1 identified as A to receive both the UHF and VHF antenna inputs. Antenna connections are made with conventional UHF/VHF connectors (not shown). The remaining connections shown on tuner 23 are through terminals no. 4, no. 7 and no. 8, AGC (Automatic gain control), B+(DC voltage input) and IF (Intermediate frequency output), respectively.

A B+ voltage of about +10 volts DC is supplied to the internal circuits of tuner 23 from +12 volt line 12 via dropping resistor 29 connected between line 12 and tuner terminal no. 7. An agc reference voltage of approximately +2 volts DC is applied to tuner terminal no. 4 by dropping resistor 27 connected between terminal no. 4 and the low voltage end of resister 29.

As will be observed from further reference to the drawing, the +12 v dc line 12 is by-passed to ground by capacitor 31. In addition by-pass capacitors 36, 37 and 38 are provided between lines 20, 21 and 22 respectively and ground; by-pass capacitors 28 and 35 are connected between tuner terminals no. 4 and no. 2 respectively and ground.

Figure 2:
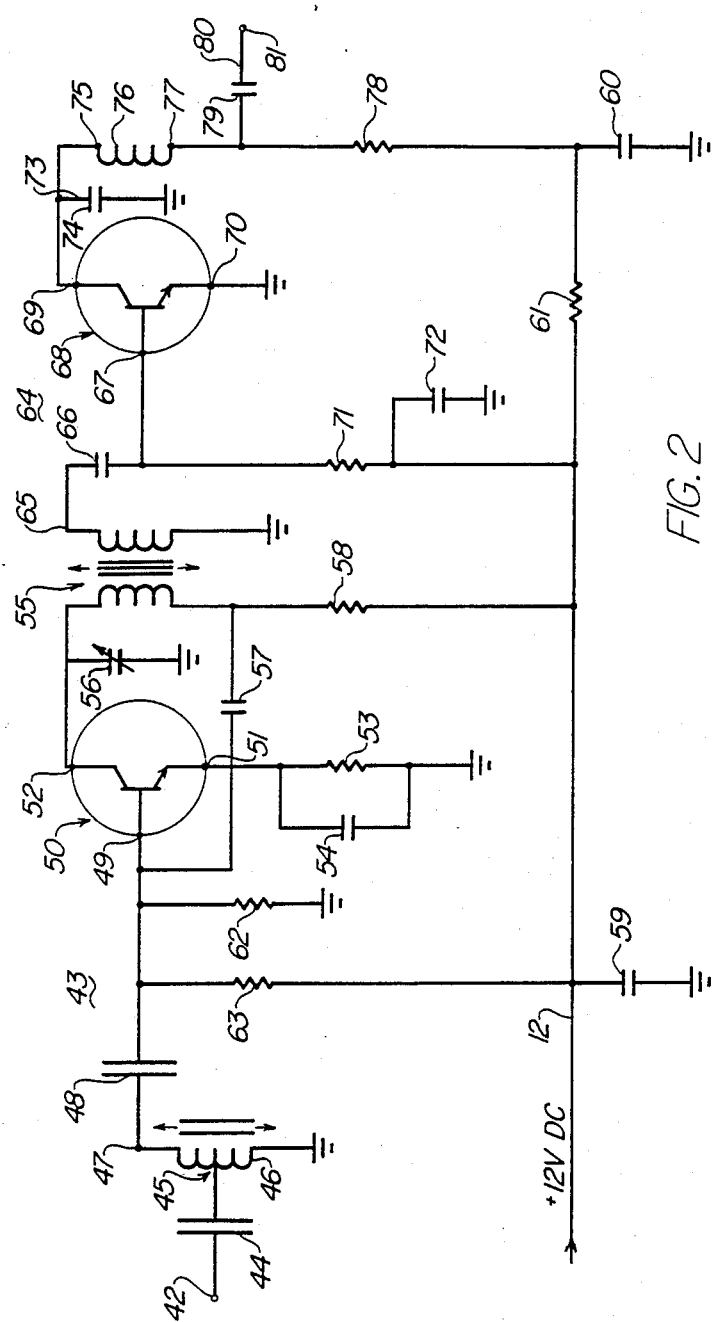
FIG. 2 a schematic diagram of interface circuits according to the invention.

Referring again to tuner 23, it will be observed that the remaining terminal on tuner 23, i.e., terminal no. 8, is connected via conductor 41 (which preferably is a shielded conductor such as any one of many conventional coaxial conductors will known to those skilled in the art) to the input 42 of the interface circuits of FIG. 2.

FIG. 2 schematically depicts the frequency conversion and other interface circuits of the present invention. The signal from input 42 is fed to converter 43 through coupling capacitor 44 and thence to the center tap 45 of variable tuned inductor 46 that is tuned to peak at approximately 44 megahertz. As will be observed from the drawing, the lower end of coil 46 is connected to ground, and the upper terminal 47 is connected through coupling capacitor 48 to base 49 of transistor 50. Although any suitable transistor or like element may be employed, in accordance with the preferred embodiment, a transistor of the standard industry designation 2N3904 is employed.

Converter 43 is seen to comprise transistor 50, emitter biasing resistor 53 and its by-pass capacitor 54 connected in parallel between emitter 51 and ground. The collector circuits connected to collector 52 comprise tunable transformer 55 which is tuned to 88 megahertz, variable capacitor 56 serving to peak the tuning of the circuit, feedback capacitor 57, and series connected de-coupling resistor 58 connected to +12 volt dc source via line 12. Providing additional decoupling in the dc source circuits are by-pass capacitors 59 and 60 and resistor 61. These latter circuits, including resistor 61 also provide automobile ignition noise suppression when the circuits are utilized in automotive applications.

Completing the input circuit to transistor 50 are resistors 62 and 63 that comprise a voltage divider to provide biasing potential for base 49.

The tuned circuit comprising tuned inductor 55 and its associated components causes the signal frequency output to be approximately 88 megahertz. As is known to those skilled in the art, 88 megahertz is a frequency at the lower end of the standard FM band.

Connected to the output winding 65 of transformer 55 is coupling capacitor 66 which conducts radio frequency energy from winding 65 to the base 67 of output amplifier transistor 68. Transistor 68 may be any of a number of conventional transistors such as, for example the well-known type 2N390. Bias resistor 71 and by-pass capacitor 72 provide decoupling and bias for the base 67 of transistor 68.

As will be observed from the drawing, the emitter 70 of transistor 68 is connected directly to ground, and the collector 69 is connected to the upper terminal 73 of capacitor 74, the remaining terminal of which is connected to ground. The collector 69 is also connected to the upper terminal 75 of stabilizing inductor 76, the lower terminal 77 of which is connected to resistor 78 and coupling capacitor 79. From capacitor 79, lead 80 conducts the output of the coupling circuits to terminal 81 from whence it may be connected to the antenna input terminal of a conventional FM receiver by any suitable connector well known to those skilled in the art.

Since the output signal at terminal 81 is at the nominal frequency of 88 megahertz, the output containing the audio of the selected TV channel may be received and heard by tuning the tuning control of the FM receiver to approximately 88 megahertz.

In operation, the FM receiver is tuned to approximately 88 megahertz, and selection is made between the VHF Low, VHF High and the UHF television bands by correspondingly positioning the slide switch 11. Tuning of the specific channel is made by adjustment of potentiometer 32.

Since the video portion of the television signal which is centered at about 1.25 mhz above the lower end of the channel will not be used the output quality of that part of the output signal from the tuner is not critical. Thus the tuning voltage from potentiometer 32 may be such as to tune slightly below the desired channel. In this way, the audio signal which is about 0.25 mhz from the upper end of the television channel will be produced at a nominal 44 mhz rather than at the normal 47.75 mhz sound subcarrier which would result using the usual 41+mgz IF and "on channel" tuning. Thus a simple doubling of the frequency at its input is all that is required of converter circuit.

By way of specific example the circuit components of the following designated values have been found suitable for use in the present invention.

| | |
|---|---|
| Tuner 23 | UVE30-A4 |
| Transistors 50 & 68 | 2N3904 |
| Resistors 15, 17, 19 | 500 ohms |
| Resistor 16 | 600 ohms |
| Resistor 27 | 22,000 ohms |
| Resistor 32 | 50,000 ohms |
| Resistors 33, 34 | 47,000 ohms |
| Resistors 53 | 220 ohms |
| Resistor 58 | 330 ohms |
| Resistor 61 | 2 ohms |
| Resistors 62, 78 | 10,000 ohms |
| Resistor 63 | 20,000 ohms |
| Resistor 71 | 1 megohm |
| Capacitors 28, 31, 35, 36, 37, 38 | 6.8 mfd. |
| Capacitors 44, 74 | 10 pf. |
| Capacitor 48 | 8 pf. |
| Capacitors 57, 66, 79 | 150 pf |
| Capacitors 54, 72 | .002 mfd. |
| Capacitor 56 | 20-25 pfd |
| Capacitors 59, 60 | 47 mfd. |

It will now be evident that there has been described herein, an improved and relatively simple and inexpensive system for listening to the audio channels of conventional television broadcasts.

Although the invention hereof has been described by way of example of a preferred embodiment, it will be evident that other adaptations and modifications may be employed without departing from the spirit and scope thereof. For example, various combinations of video tuners and FM receivers may be connected to the input and output circuits.

The terms and expressions employed herein have been used as terms of description and no of limitation; and thus, there is not intent of excluding equivalents, but on the contrary it is intended to cover any and all equivalents that may be employed without departing from the spirit and scope of the invention.

What is claimed is:

1. A system for providing reception of television audio signals through conventional battery powdered FM radio receivers comprising:
    (a) a television signal tuner means adapted to receive modulated television broadcast signal carriers at any selected standard channel carrier frequency and to convert said modulated channel carrier frequency signals to a correspondingly modulated conventional television intermediate carrier frequency signals;
    (b) a frequency converter means adapted to receive said modulated intermediate frequency carrier signals by direct connection from said tuner means and to produce in response thereto correspondingly modulated carrier signals at least partially within the FM radio band comprising a first transistor means having its input tuned at the television sound sub-carrier frequency of said modulated intermediate frequency carrier signals from said tuner, a second transistor means and a tunable coupling circuit between said first and said second transistor means, said coupling circuit being electively tunable to frequencies within the FM radio band;
    (c) means connecting said tuner means and said converter means to be powdered from a battery source also powering said FM radio receiver;
    (d) antenna connection means to said tuner for the reception of said TV signals;
    (e) means connecting said intermediate frequency signal produced by said tuner to said input of said first transistor means;
    (f) and means connecting signals from said coupling circuit through said second transistor means to the antenna circuit of said FM radio receiver.

2. A system as defined in claim 1 further including means for selecting the said standard channel carrier frequency receiver by said tuner.

3. The system as defined in claim 2 wherein said means for selecting said standard channel carrier frequency comprises a variable voltage means.

4. A system as defined in claim 1 wherein said first and said second transistor means are NPN transistors.

* * * * *

UNITED STATES PATENT AND TRADEMARK OFFICE
CERTIFICATE OF CORRECTION

PATENT NO. : 4,905,303

DATED : February 27, 1990

INVENTOR(S) : John L. Johnson; Robert J. Pitre

It is certified that error appears in the above-identified patent and that said Letters Patent is hereby corrected as shown below:

Column 6, line 7, change "powdered" to -- powered --

Column 6, line 31, change "powdered" to -- powered --

Signed and Sealed this

Twenty-sixth Day of February, 1991

Attest:

HARRY F. MANBECK, JR.

*Attesting Officer*　　　　　*Commissioner of Patents and Trademarks*